Sept. 1, 1953 J. M. MERGEN 2,650,864
MULTIPLE RACE BALL BEARING
Filed April 26, 1950 2 Sheets-Sheet 1

INVENTOR.
JOSEPH M. MERGEN
BY
ATTORNEY.

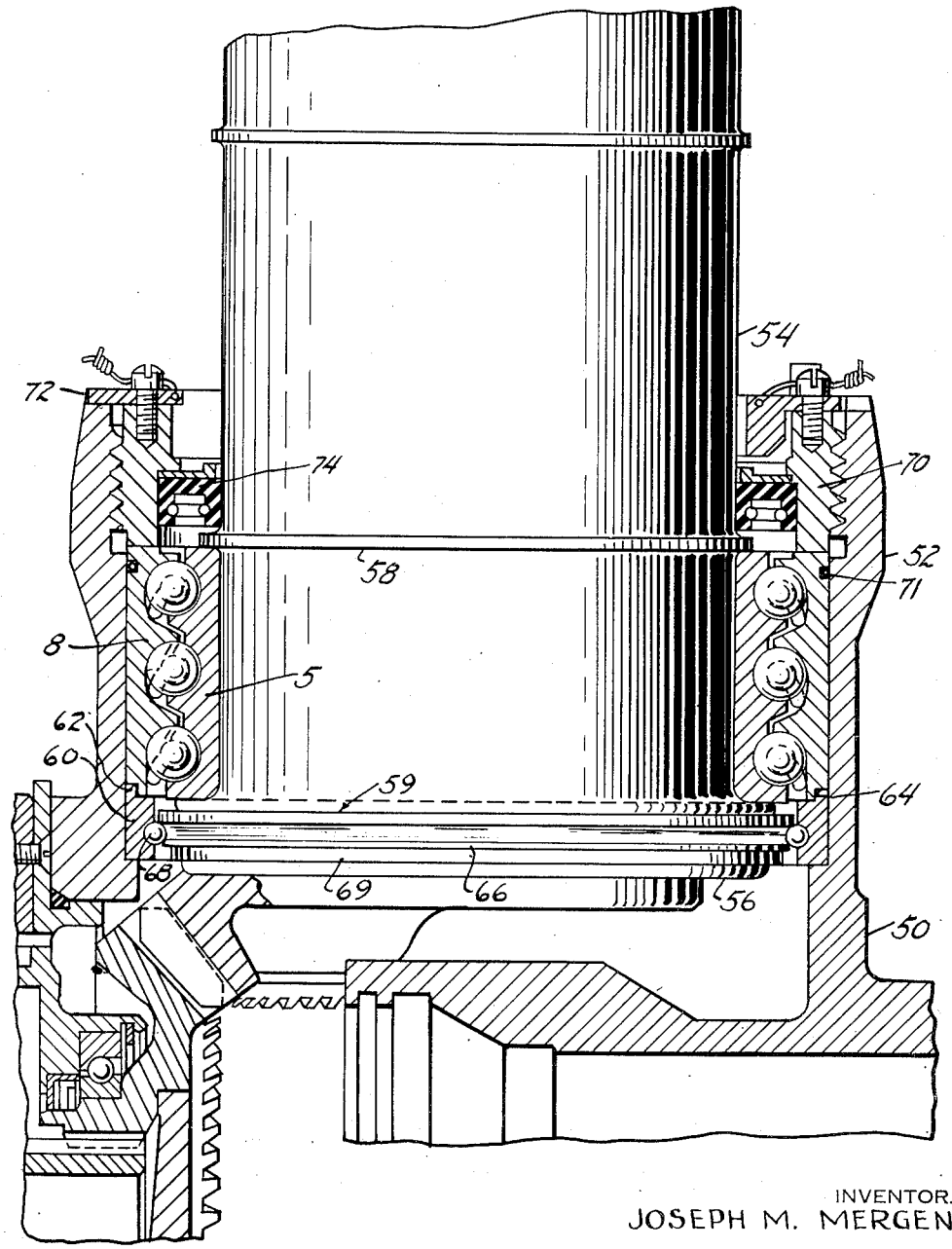

Patented Sept. 1, 1953

2,650,864

UNITED STATES PATENT OFFICE 2,650,864

MULTIPLE RACE BALL BEARING

Joseph M. Mergen, Verona, N. J., assignor to Curtiss-Wright Corporation, a corporation of Delaware Application April 26, 1950, Serial No. 158,123

4 Claims. (Cl. 308—174)

This invention relates to ball bearings of the type wherein the inner and outer race members each have a plurality of ball containing grooves, and wherein the bearing is adapted to assume axial loading in one predominant direction and radial loading.

Bearings of this class find particular utility in the blade retention systems for controllable pitch aircraft propellers but are not necessarily limited to usefulness in this environment.

It is an object of the present invention to provide a so-called stack bearing construction in which axial bearing loading may be increased and in which the possibility of bearing failure due to high axial loading may be decreased. In this connection, stack bearings of the prior art when exposed to high axial loading plus vibration, have encountered the possibility of failure due to breakdown of the bearing race material at the bearing race corners adjacent the highly loaded zones. The present bearing overcomes this incipient defect by extending the ball engaging grooves of the bearing races beyond the zones where maximum stress concentration is likely to occur. Briefly, this result is obtained by constructing the multiple grooved races with stepped portions in the race member walls, which have the effect of enabling the bearing to assume loads applied more nearly in an axial direction.

Further objects of the invention will become apparent in reading the annexed detailed description in conjunction with the drawings wherein similar reference characters indicate similar parts and wherein Fig. 1 is a perspective view of a bearing according to the invention showing portions thereof in section;

Fig. 4 is a longitudinal section of a propeller hub and blade retention showing one mode of application of the bearing of the invention.

Figure 1:
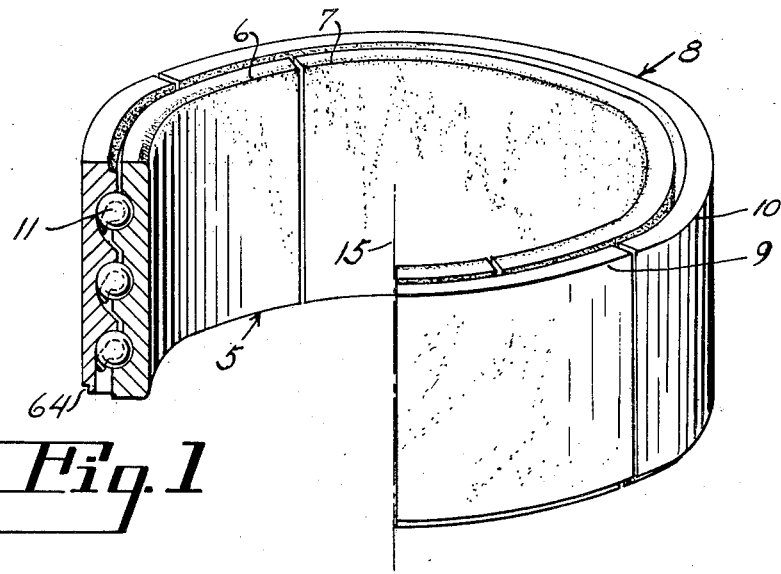
Figure 2:
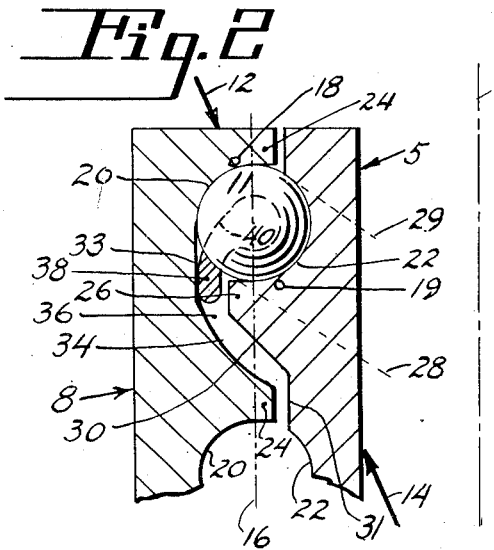
Fig. 2 is an enlarged longitudinal section through a portion of the bearing.

The bearing of the invention comprises an inner race 5 comprising split halves 6 and 7, an outer race 8 comprising split halves 9 and 10, and a plurality of ball races on the exterior of the inner member 5 and on the interior of the outer member 8 engaged by a plurality of bearing balls 11. The invention lies particularly in the races above mentioned which are engaged by the balls 11. Reference may now be made to Fig. 2 for the specific improved construction.

The normal direction of loading of the bearing is in accordance with the vectors 12 and 14. The bearing center line is indicated at 15, and a construction cylinder is indicated at 16, such cylinder passing through the centers of all of the balls 11 in the bearing assembly. In the usual type of stack bearing, the outermost margins of the inner race member 5 and the innermost margins of the outer race member 8 lie on opposite sides of the cylinder 16 to increase the ease of fabrication and assembly of the bearing. However, in such older type bearing, when the loading represented by the vectors 12 and 14 are applied thereto, zones of high load concentration are created at points represented at 18 and 19. These zones lie very close to the edges of the bearing grooves and if the bearing is subjected to excessive load resulting in high stress or normal stress plus stress due to vibration, failure of the corners of the bearing races may occur.

In the bearing of the invention, the ball grooves 20 of the outer member 8 and ball grooves 22 of the inner member 5 are offset from the normal plane of rotation, by the construction of inner extensions 24 on the outer race and outer extensions 26 on the inner race. By these extensions, the center of the arc of the race 22 is axially displaced in the direction of the bearing axis below the center of the ball 11 as shown while the center of the arc of the ball race 20 is displaced in the direction of the bearing axis above the center of the ball 11 as shown. Thus, when axial loads are applied to the bearing there is ample material in the race members at the zones 18 and 19, because of the extensions 24 and 26, to resist failure or spalling of the race edges or surfaces, consequently increasing the capacity of the bearing.

Another way of describing the geometry of the bearing is to say that the summed tangents of the ball races at their corners describe cones 28 and 29, all having their apices on the bearing axis 15 and all nesting together, enabling the bearing to assume axial loading without having high stress concentrations near the corners of the bearing races as engaged by the balls 11.

The extension 26 of the inner race member is stepped inwardly at 30 to a cylindrical portion 31 whose diameter is less than that of the construction cylinder 16 below which portion 31 the next arcuate ball race 22 is formed. Correspondingly, on the outer race, the portion below the race 20 is made cylindrical as at 33 and of a diameter considerably greater than the construction cylinder 16, this portion 26 being stepped as at 34 to another small diameter extension 24 providing the upper border for another outer ball race 20. Sufficient spacing may be designed into the bearing as at 36, between the portions 33 and 26, to accommodate a ball retainer or spacer 38, the solid limb of which occupies this space, said limb having extensions 40 extending into the space between the races 20 and 22 and between the balls 11 to separate them. Any desired type of ball retainer 38 may be utilized—in one preferred embodiment of the invention, such retainers are fabricated from molded nylon and have proven to be very effective.

Figure 3:
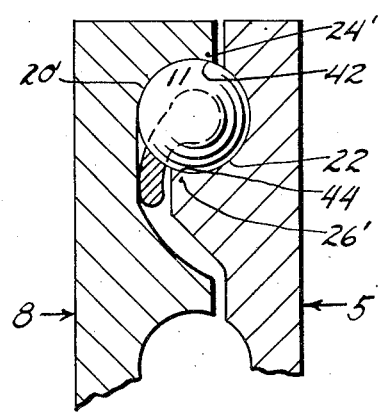
Fig. 3 is an enlarged longitudinal section of a portion of the bearing showing an alternative configuration.

In Fig. 2, the upper faces of the extensions 26 and the lower faces of the extensions 24, respectively outwardly and inwardly of the construction cylinder 16, are shown as being planar, to provide greater ease in the fabrication of the bearing races. In Fig. 3 an alternative arrangement is shown wherein the race surfaces 42 and 44 of the extensions 24′ and 26′ are shown as conforming to the curvature of the balls 11. While this arrangement may be slightly more difficult to fabricate, it can provide better resistance to failure and a slightly increased bearing capacity.

The form of the steps such as 30 and 34 of Fig. 2 may be altered from the specific forms shown in Figs. 2 and 3 as the designer may see fit, since the surfaces of these steps, per se, are not functional in enabling the practice of the invention. Predominantly, the improved function of the bearing is obtained by the provision of the extensions such as 24 and 26, in all of the rows of the stack bearings, to endow the bearing with an increased capacity for axial loading, this improvement being obtained by the avoidance of high localized stress concentrations in the bearings adjacent the edges of the bearing grooves.

It is realized that this general sort of load distribution has been utilized in single row combined axially and radially loaded bearings but it is believed that the present invention represents the first occurrence when principles of this sort have been applied to multiple row stack bearings where the several ball grooves are formed in integral inner and outer race members.

The splitting of the outer race member 8 into two halves is necessary to enable assembly of the outer race over the inner race. Without such a split, the race members 8 and 5 could not be sleeved over one another due to the overlapping portions 24 and 26 on the races.

Reference may be had to Fig. 4 to show the general environment for which a bearing of the type described is adapted. Herein, a propeller hub is shown at 50, the hub including a blade socket 52. A blade shank 54, having a load flange 56 at its inner end, is embraced by the inner ball bearing race 5, the race halves being assembled around the shank 54 between the flange 56 and an auxiliary flange 58 which may be formed on the blade if desired to hold the race 11 in proper axial position. The strings of bearing balls 11 are then assembled in the grooves of the race member 5 after which the two halves of the outer race member 8 are assembled around the balls. This assembly is retained in position by unitary preload bearing 59 having a preload bearing race 60 with an upper lip 62 engaging an annular groove 64 formed around the outer stack bearing race 8. The inner race 66 of the preload bearing, and balls 68 therefor, are indicated and the bearing 59 is assembled around the blade shank flange 56, being secured in position by a snap ring 69. This secures the stack bearing, since the halves of the outer race member 8 cannot come apart unless the halves are free to be moved radially. Radial movement is prevented while the lip 62 engages the race halves, and the halves are prevented from rising above the lip 62 by abutment of the bearing race steps 30 and 34 with one another and restraint, by the blade flange 58, on the inner race member 5. As an alternative to the lip 62, or in conjunction therewith, one or more garter springs 71 may be assembled around the race member 8 in suitable grooves in the race member.

The blade shank with the bearing assembly is then inserted in the blade socket 52 whereupon a retaining nut 70 is screwed into the outer end of the blade socket, locking the outer stack bearing race 8 firmly to the propeller hub. Conventional retaining nut locks such as 72 are then applied. The retaining nut 70 includes a lubricant seal 74 engaging the outer surface of the blade shank and the inner surface of the retaining nut to prevent leakage of lubricant from the propeller hub.

In the propeller environment above described, centrifugal force acting upon the propeller blade exerts a high loading in the direction of the blade axis which is resisted by the stack bearing comprising the elements 5, 8 and 11. Radial loads on the bearing are imposed by bending moments upon the propeller blade and any vibration induced by the propeller blade from aerodynamic or other effects, or from engine excited vibrations transmitted into the propeller hub from the engine. All these must be assumed in the bearing 5, 8, 11. This bearing then must necessarily embody high resistance to steady state and vibratory loading and substantial improvement in these characteristics is afforded by the present invention.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. A multiple race stack type ball bearing for axial and radial loading and wherein the loading is more nearly axial than radial, comprising a longitudinally split otherwise integral inner race having a wall profile characterized in sequence by a cylindrical portion; a toroidal grooved race portion having balls therein, the diameter of the circle passing through the ball centers being more than the diameter of said cylindrical portion; a cylindrical portion of diameter greater than the diameter of the ball center circle; a step; a cylindrical portion like the first cylindrical portion and so on in sequence; and a longitudinally split otherwise integral outer race having a wall profile characterized by a cylindrical portion of diameter less than the diameter of the ball center circle, a toroidal grooved race portion engaged by the balls, a cylindrical portion of diameter greater than the diameter of the ball center circle, a step, a cylindrical portion like the first mentioned outer race cylindrical portion, and so on in sequence.

2. A multiple race stack type ball bearing for axial and radial loading comprising inner and outer longitudinally split otherwise integral cylindrical race members having opposite toroidal races therein engaged by bearing balls each race having substantially 90° of linear contact with the engaged balls, said race members being so formed in respect to the races, that the mid-portions of each of the outer member races are displaced axially of the bearing to one side of each ball center circle, and the mid-portions of each of the inner member races are displaced axially of the bearing to the other side of each ball center circle.

3. A multiple race anti-friction bearing comprising a substantially cylindrical longitudinally split otherwise integral inner race member having a plurality of external ball grooves formed therein in axially spaced relation, balls in said grooves, said member having the margin at one end of each groove larger in diameter than the circle defined by the ball centers when the balls are engaged with the member, said larger diameter margins being at the respective same ends of the several grooves, an outer longtitudinally split otherwise integral substantially cylindrical race member embracing the inner member having a plurality of internal axially spaced ball grooves formed therein, said outer member having one margin of each groove smaller in diameter than the ball center circle, said small diameter margins lying at the respective same ends of the grooves and diagonally across the balls from the larger diameter margins of the grooves on the inner race member.

4. A multiple race anti-friction bearing comprising a substantially cylindrical longitudinally split otherwise integral inner race member having a plurality of annular shoulders axially spaced therealong, each shoulder on one end thereof defining with the member surface a ball race groove, balls in said grooves, the diameter of the circle on which the ball centers lie being less than the external diameter of said shoulders; an outer longitudinally split otherwise integral substantially cylindrical race member having a plurality of internal annular shoulders axially spaced therealong and fitted between the shoulders on the inner race member, each outer member shoulder defining with the member inner surface an internal ball race groove, the inside diameter of the shoulders of said outer member being less than the diameter of the circle on which the ball centers lie; whereby the shoulders of the outer and inner members are diagonally disposed on opposite sides of the bearing balls to assume axial loading on said bearing.

JOSEPH M. MERGEN.

References Cited in the file of this patent

UNITED STATES PATENTS

| Number | Name | Date |
|---|---|---|
| 1,452,603 | Himes | Apr. 24, 1923 |
| 1,644,611 | Rieffert | Oct. 4, 1927 |
| 1,671,372 | Leedham | May 29, 1928 |
| 2,109,696 | Hackenthal | Mar. 1, 1938 |
| 2,197,499 | Heinze | Apr. 16, 1940 |
| 2,499,837 | Sheets | Mar. 7, 1950 |
| 2,500,692 | Martin | Mar. 14, 1950 |
| 2,504,737 | Sharpes | Apr. 18, 1950 |
| 2,511,687 | Andrews | June 13, 1950 |

FOREIGN PATENTS

| Number | Country | Date |
|---|---|---|
| 204,864 | Great Britain | Oct. 11, 1923 |
| 633,367 | France | Jan. 27, 1928 |